May 13, 1924.

G. W. COOK

AUTOMOBILE SUPPORT

Filed May 28, 1923

Inventor

George W. Cook

May 13, 1924.
G. W. COOK
1,493,475
AUTOMOBILE SUPPORT
Filed May 28, 1923
2 Sheets-Sheet 2
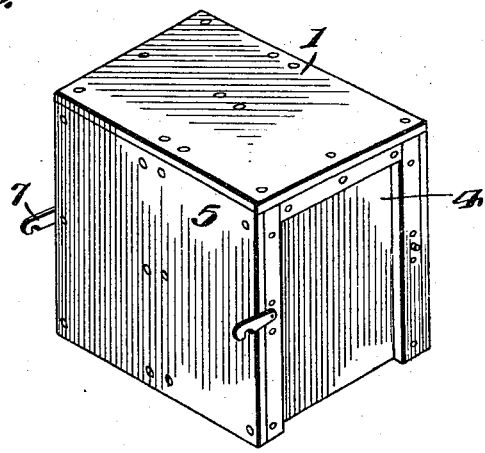
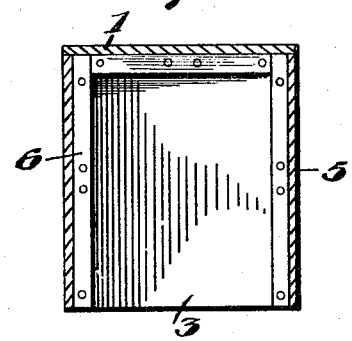
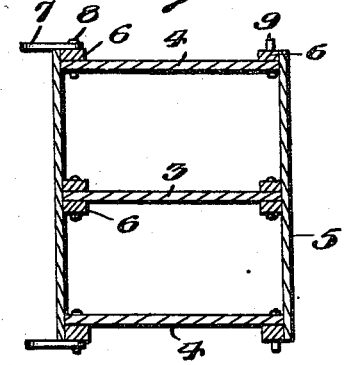
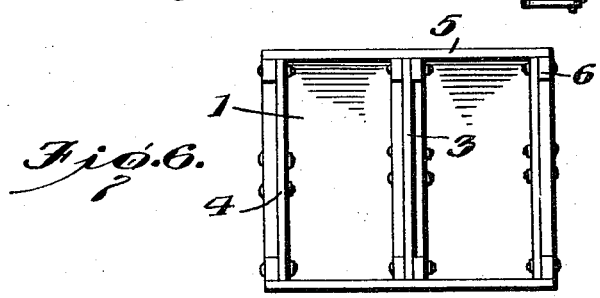
Inventor
George W Cook Patented May 13, 1924.

1,493,475

UNITED STATES PATENT OFFICE.

GEORGE W. COOK, OF MUSKEGON, MICHIGAN.

AUTOMOBILE SUPPORT.

Application filed May 28, 1923. Serial No. 642,025.

*To all whom it may concern:*

Be it known that I, GEORGE W. COOK, a citizen of the United States, residing at Muskegon, in the county of Muskegon and State of Michigan, have invented certain new and useful Improvements in Automobile Supports, of which the following is a specification.

This invention relates to improvements in automobile supports and has for its prime object to provide for owners of automobiles a convenient support upon which the machine can be placed for getting beneath same to make repairs.

A further object of the invention is to provide a support for automobiles, whereby an automobile can be easily and readily elevated off of the floor of a garage so that a workman can conveniently work beneath same and whereby part of the support used in elevating the machine can be removed for the purpose of elevating a machine in some other part of the garage.

A still further object of my invention is to provide a support for elevating an automobile, which comprises a series of individual members which are adapted to be securely fastened in alignment for receiving thereon the automobile.

And a still further object of the invention is to provide a support of the above indicated character, which can be packed and stored away in a relatively small space when not being used.

Another object of the invention is to provide a support of the above indicated character, which is simple in construction, durable, efficient for the purpose intended, and one that can be manufactured and installed in all garages at a relatively low cost.

These and like objects of the invention will be better understood as the description follows and as is specifically pointed out in the appended claims.

Referring to the accompanying drawings which form a part of this specification and which clearly illustrate the construction and operation of my improved automobile support, Figure 1 is a side elevation of my improved support in use with an automobile thereon.

Figure 3 is a perspective view of one of the supporting members.

Figure 4 is a vertical section through one of the supporting members.

Figure 5 is a horizontal section through one of the supporting members, and

Figure 6 is a bottom plan view of one of the supporting members.

Referring to the accompanying drawings in detail, like characters will be used to designate like parts in the different views.

Figure 1:
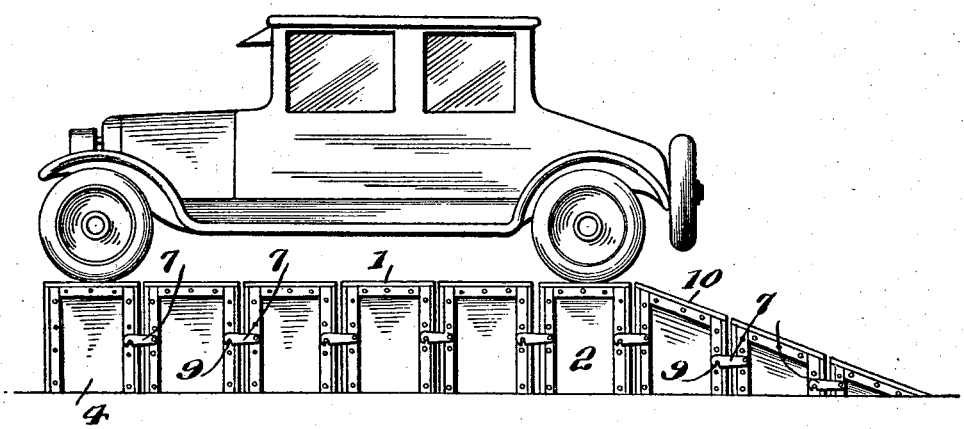
Figure 2:
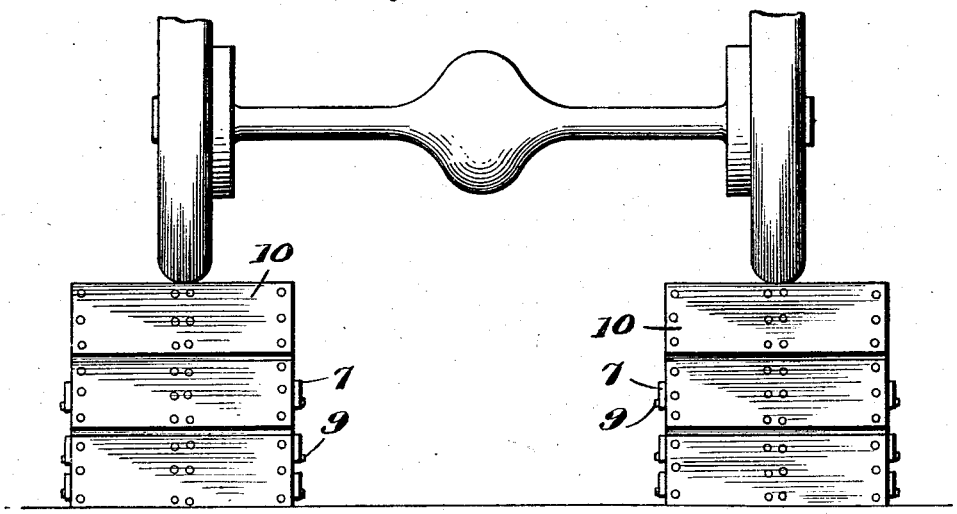
Figure 2 is a front end elevation of same.

In the drawings, the numeral 1 indicates the top or platform of my improved support, to provide parallel horizontal tracks for the wheels of an automobile. It is to be understood that there are no connections between said tracks, thus permitting the tracks to be moved or separated for any desired width.

Each of the track members comprises a series of box-like members 3, each of which is provided with a reinforcing central wall 3, which cooperates with the side walls 4 and end walls 5 to act as supporting legs for the box member. Reinforcing braces 6 are secured at the meeting ends of each of the side and end walls, and a hook 7 is pivotally connected to the forward side braces 6 as at 8, while the rearward braces 6 of each box-like member is provided with a pin 9 for receiving thereon the hook 7 of the adjacent box-like member 2.

Mounted at the front end of the track 1 are a second series of box-like members, the top of which have inclined surfaces as at 10, each box-like member being slightly smaller than the proceeding one, so as to provide an elevated track on which the automobile may be moved to bring same to the position shown in Figure 1.

When it is desired to place an automobile in an elevated position so that a workman may conveniently work beneath same, the box-like members are placed side by side in two rows to provide tracks 1, after which the box-like members having inclined surfaces are placed in the front of each series of boxes and the hooks or locking fasteners 7 are brought into engagement with the pins 9 carried by the adjacent box. After the automobile has been elevated to the position shown in Figure 1, either under its own power or by being drawn thereon, the hooks 7 are unfastened, thus permitting all of the boxes to be withdrawn, as sufficient space is left between each to prevent crowding, so that said boxes can be used for elevating another machine in some other part of the garage.

In view of the foregoing description of my invention taken in connection with the accompanying drawings, it is thought that any further explanation as to the construction, operation and objects of the invention is unnecessary.

While I have shown and described the preferred form of my invention, I realize that various minor changes may be resorted to, without departing from the spirit and scope of the invention as claimed, and therefore, I do not wish to limit myself to the exact details of construction shown, nor to the combination and arrangement of parts.

What I claim as new and desire to secure by Letters Patent is:

1. In a portable automobile support, the combination with a platform adapted to receive upon itself an automobile, a series of box-like frames, means for fastening said box-like members positioned at the front end of each of said frames having inclined top surfaces to provide a runway for elevating an automobile to said platform.

2. In a portable automobile support, comprising a series of box-like frames adapted to be positioned in alignment for forming a track for said automobile, means upon each box-like frame for fastening the adjacent box-like frame thereto, and means attached to the front end of said aligned box-like frames to provide a runway for elevating an automobile onto said platform.

3. In a portable automobile support, a series of box-like frames adapted to be positioned in parallel alignment for receiving thereon the wheels of an automobile, means for reinforcing the box-like frames, and means for detachably fastening the boxes together for holding same in alignment.

In testimony whereof, I have affixed my signature in the presence of two witnesses.

GEORGE W. COOK.

Witnesses:
JOHN SIMPSON,
OSCAR SMITH.